United States Patent
Chakraborty

(10) Patent No.: US 7,756,250 B2
(45) Date of Patent: Jul. 13, 2010

(54) X-RAY DETECTOR

(75) Inventor: Shamik Chakraborty, Bangalore (IN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 116 days.

(21) Appl. No.: 11/780,931

(22) Filed: Jul. 20, 2007

(65) Prior Publication Data

US 2008/0025465 A1    Jan. 31, 2008

(30) Foreign Application Priority Data

Jul. 25, 2006    (JP) .............................. 2006-201618

(51) Int. Cl.
*H05G 1/64* (2006.01)
*H01L 27/146* (2006.01)

(52) U.S. Cl. ..................... 378/98; 378/98.8; 250/370.09

(58) Field of Classification Search .................. 378/19, 378/22, 91, 98, 98.8, 901; 250/370.09
See application file for complete search history.

(56) References Cited

U.S. PATENT DOCUMENTS

| | | | |
|---|---|---|---|
| 6,005,911 A * | 12/1999 | Cheung | 378/37 |
| 6,172,369 B1 | 1/2001 | Waechter et al. | |
| 6,222,906 B1 | 4/2001 | Sakaguchi et al. | |
| 6,724,855 B2 | 4/2004 | Sugawara et al. | |
| 6,849,853 B2 | 2/2005 | Ikeda et al. | |
| 6,868,138 B2 | 3/2005 | Clinthorne et al. | |
| 6,944,265 B2 | 9/2005 | Warp et al. | |
| 2004/0076259 A1* | 4/2004 | Jensen et al. | 378/91 |
| 2006/0034427 A1* | 2/2006 | Brooks | 378/198 |

FOREIGN PATENT DOCUMENTS

JP    11-178816    7/1999

* cited by examiner

*Primary Examiner*—Edward J Glick
*Assistant Examiner*—Anastasia Midkiff
(74) *Attorney, Agent, or Firm*—Armstrong Teasdale LLP

(57) ABSTRACT

An X-ray detector to make possible digitization of an existing X-ray imaging apparatus is to be realized. Also an X-ray detector excellent in versatility is to be realized. This is an X-ray detector having a flat panel type detector unit for detecting the two-dimensional intensity distribution of incident X-rays and an interface unit for a detection signal utilizing device, and the interface unit conforms to open standards regarding images for medical use and communication. The interface unit has a first node on the detector unit side, a second node on the detection signal utilizing device side and a network linking them. The network is the Ethernet. The first node and the second node perform communication conforming to TCP/IP. The first node is integrated with the detector unit. The open standards regarding images for medical use and communication are the DICOM standards.

20 Claims, 2 Drawing Sheets

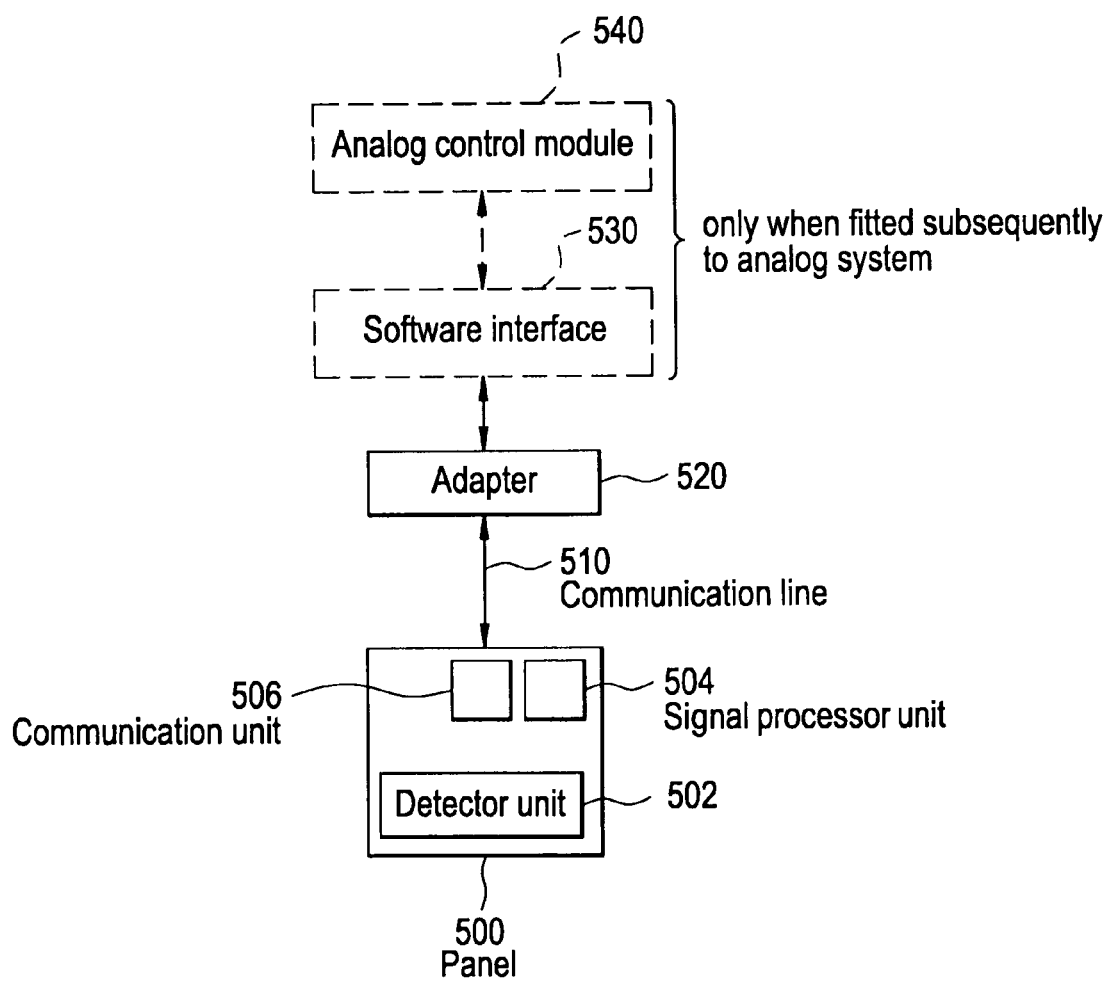

X-RAY DETECTOR

CROSS REFERENCE TO RELATED APPLICATIONS

This application claims the benefit of Japanese Application No. 2006-201618 filed Jul. 25, 2006, which is hereby incorporated by reference in its entirety.

BACKGROUND OF THE INVENTION

The present invention relates to an X-ray detector, and more particularly to a flat panel X-ray detector for detecting the two-dimensional intensity distribution of incident X-rays.

In a digital type X-ray imaging apparatus, a flat panel X-ray detector is used. A flat panel X-ray detector has a detector unit for detecting the two-dimensional intensity distribution of incident X-rays, namely the flat panel, and an interface unit for relaying detection signals to a signal utilizing device, such as an imaging apparatus per se or the like (see Patent Document 1 for instance).

As what is opposed to a digital type X-ray imaging apparatus, there is an analog type X-ray imaging apparatus. A larger number of analog type X-ray imaging apparatuses than digital type ones are in operation and they are less expensive, partly because of their historical precedence.

[Patent Document1] JP-A No. 11-178816

Successful pursuit of more advanced medical treatment inevitably requires digitization of X-ray imaging, and the users of analog type X-ray imaging apparatuses are also pressed to equip themselves with digital type X-ray imaging apparatuses. However, users would have to bear a considerable economic burden to equip themselves with a digital type X-ray imaging apparatus.

SUMMARY OF THE INVENTION

Therefore, an object of the present invention is to realize an X-ray detector which would make possible digitization of an existing X-ray imaging apparatus. Another object is to realize an X-ray detector excelling in versatility.

MEANS FOR SOLVING THE PROBLEM

The present invention to solve the problem noted above is an X-ray detector having a flat panel detector unit for detecting the two-dimensional intensity distribution of incident X-rays and an interface unit for a signal utilizing device, wherein the interface unit meets open standards regarding images for medical use and communication.

It is preferable, from the view point of facilitating adaptation to open standards regarding images for medical use and communication, for the interface unit to have a first node on the detector unit side, a second node on the detection signal utilizing device side, and a network linking them.

It is preferable, from the viewpoint of ensuring versatility, for the network to be the Ethernet.

It is preferable, from the viewpoint of ensuring versatility, for the first node and the second node to perform communication conforming to TCP/IP.

It is preferable, from the viewpoint of ensuring handling ease, for the first node to be integrated with the detector unit.

It is preferable, from the viewpoint of ensuring versatility, for the open standards regarding images for medical use and communication to be the DICOM standards.

According to the invention, since the X-ray detector is an X-ray detector having a flat panel detector unit for detecting the two-dimensional intensity distribution of incident X-rays and an interface unit for a signal utilizing device, and the interface unit meets open standards regarding images for medical use and communication, it makes possible realization of digitization of an X-ray detector which enables existing X-ray imaging apparatuses to be digitized. It also makes possible realization of an X-ray detector excelling in versatility.

Further objects and advantages of the present invention will be apparent from the following description of the preferred embodiments of the invention as illustrated in the accompanying drawings.

BRIEF DESCRIPTION OF THE INVENTION

FIG. 2 is a diagram showing the configuration of an X-ray detector, which is an example in one of the best modes for carrying out the present invention.

DETAILED DESCRIPTION OF THE INVENTION

Figure 1:
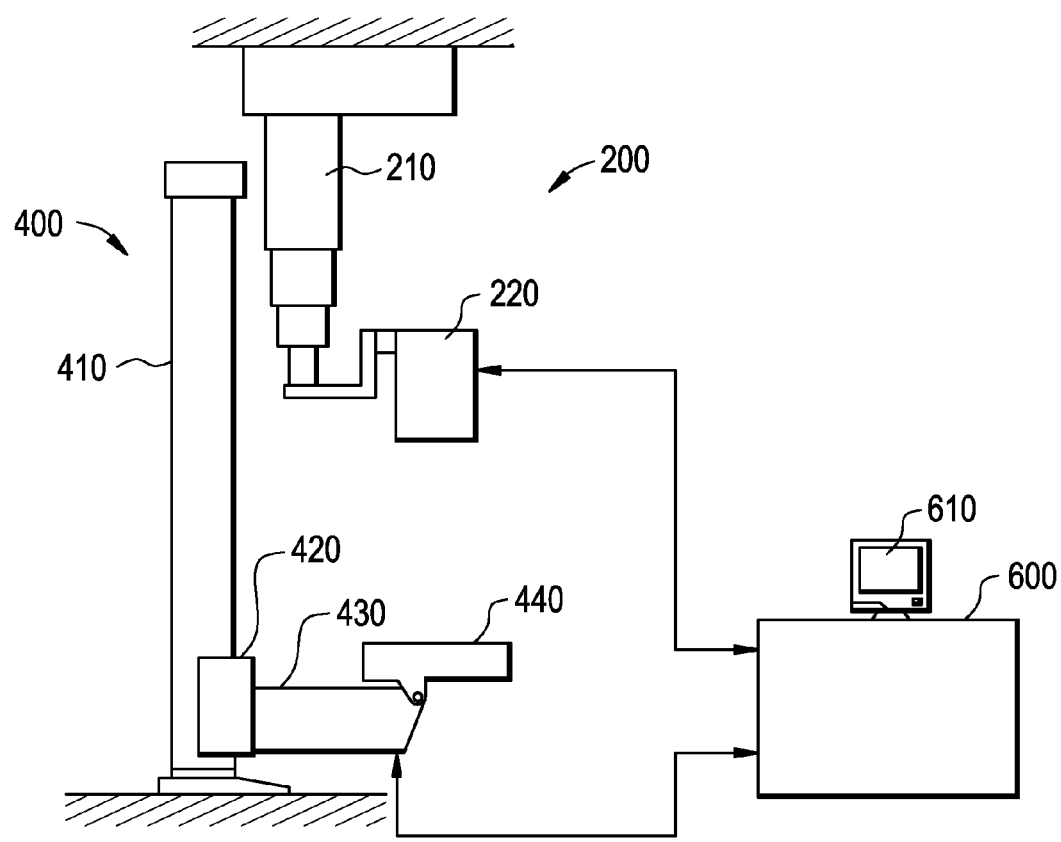
FIG. 1 is a diagram showing the configuration of an X-ray imaging apparatus.

The best modes for implementing the present invention will be described in further detail below with reference to the accompanying drawings. Incidentally, the present invention is not limited to the best modes for implementing the invention. FIG. 1 shows a schematic configuration of an X-ray imaging apparatus. This apparatus is one example of the best modes for implementing the invention. This apparatus is an X-ray imaging apparatus using an X-ray detector, which is one example of the best modes for implementing the invention.

As shown in FIG. 1, this apparatus has an X-ray radiating device 200 and an X-ray detecting device 400. The X-ray radiating device 200 is configured by fitting an X-ray source 220 to the tip of a column 210 hanging from the ceiling. The X-ray source 220 is enabled to alter the radiating direction of the X-rays by changing its orientation. The column 210 supporting the X-ray source 220 can expand or contract in the lengthwise direction and can move in the horizontal position along the ceiling.

The X-ray detecting device 400 is configured by liftably fitting a carriage 420 to a column 410 erecting upright from the floor, horizontally fitting an arm 430 to the carriage 420, and fitting an X-ray detector 440 to the tip of the arm 430.

The X-ray detector 440 is a planar-shaped structure, whose light receiving face is variable in inclination to be horizontal or vertical according to the incident direction of X-rays.

Detection signals of the X-ray detector 440 are inputted into an operator console 600. The operator console 600 reconstructs a fluoroscopic image of the subject of imaging on the basis of input signals from the X-ray detector 440 and displays it on a display 610.

The operator console 600 controls the X-ray radiating device 200 and the X-ray detecting device 400 as operated by the operator. For the X-ray radiating device 200, it controls the positions of the X-ray source 220 in the horizontal and vertical directions and the direction of the X-ray radiation, and also controls the X-ray intensity and radiation timing. For the X-ray detecting device 400, it controls the height of the X-ray detector 440 to match the X-ray source 220, and also controls the inclination of the light receiving face to make it horizontal or vertical relative to the incident direction of X-rays.

FIG. 2 schematically shows the configuration of the X-ray detector 440. The X-ray detector 440 is an example in one of the best modes for carrying out the present invention. The configuration of the X-ray detector 440 presents an example in one of the best modes for carrying out the invention regarding an X-ray detector.

As shown in FIG. 2, the X-ray detector 440 has a panel 500. The panel 500 has a detector unit 502. The detector unit 502 is a flat panel type detector unit, which is configured of many detection cells arranged two-dimensionally. Each individual detection cell is composed, for instance, of a scintillator and a photodiode. The detector unit 502 is one example of detector unit according to the invention.

The panel 500 also has a signal processor unit 504 and a communication unit 506. The signal processor unit 504 performs prescribed processing of the X-ray detection signals of the detector unit 502 such as data collection and buffering. The signal processor unit 504 is composed of a microprocessor or the like. The functions of the signal processor unit 504 can be expanded.

The communication unit 506 communicates with outside. The communication unit 506 externally transmits data collected by the signal processor unit 504. The communication unit 506 also receives, and conveys to the signal processor unit 504, various commands from outside. The communication protocol to be used is, for instance, TCP/IP (transmission control protocol/internet protocol). The communication unit 506 is composed of a microprocessor or the like. The communication unit 506 may be integrated with the signal processor unit 504.

The communication unit 506 is connected to an adapter 520 by a communication line 510. The adapter 520 is an adapter for an apparatus using X-ray detection signals, namely an imaging apparatus per se, and is composed of a microprocessor or the like. As the communication line 510, for instance, the Ethernet is used. It is not limited to the Ethernet, but any other suitable network may be used. On the communication line 510, the communication unit 506 constitutes one node and the adapter 520, the other node.

The part consisting of the signal processor unit 504, the communication unit 506, the communication line 510 and the adapter 520 is one example of interface according to the invention. The communication line 510 is one example of network according to the invention. The communication unit 506 is one example of first node according to the invention. The adapter 520 is one example of second node according to the invention.

The adapter 520 has functions to perform data processing and communication conforming to open standards regarding images for medical use and communication. As such open standards regarding images for medical use and communication, for instance DICOM (Digital Imaging and Communication in Medicine) standards are adopted. The DICOM standards are not the only choice, but other appropriate open standards may as well be adopted.

This causes the adapter 520 to operate as an SCP (Service Class Provider) and an SCU (Service Class User), and to process a prescribed SOP class (Service-Object Pair Classes) regarding the processing of X-ray detection signals.

Since the interface unit has the first node on the detector unit side, the second node on the detection signal utilizing device side and the network linking them in this way, it can facilitate adaptation to open standards regarding images for medical use and communication.

Further, as the network is the Ethernet, versatility can be achieved. Further, as the first node and the second node perform communication conforming to TCP/IP, this also can provide versatility. Also, as the first node is integrated with the detector unit, handling ease is achieved. Moreover, since the open standards regarding images for medical use and communication are the DICOM standards, versatility can be achieved.

As the adapter 520 conforms to the DICOM standards, the signal utilizing device side, such as the imaging apparatus, if it only is compatible with the DICOM standards, the X-ray detector 440 can be utilized irrespective of other conditions such as the make, specifications, configuration and so forth.

Thus, the X-ray detector 440 has excellent versatility permitting so-called plug and play. This makes the X-ray detector 440 a versatile spare part, marketable by itself.

This versatility makes possible substantial digitization of the imaging apparatus per se, even if it is an analog type device, by fitting the X-ray detector 440 subsequently. In that case, a software interface 530 and an analog control module 540 are provided between the imaging apparatus per se and the adapter 520.

The software interface 530 is intended to make possible communication with the imaging apparatus per se, while the analog control module 540 is intended to make possible control of the imaging apparatus per se. These software interface 530 and analog control module 540, which are produced for each imaging apparatus, are easy and inexpensive to fabricate as they have only to satisfy simple requirements of the communication protocol and basic control functions.

To add, the recipient of the subsequent fitting is not limited to an analog type imaging apparatus per se but may as well be a digital type imaging apparatus per se. In that case, if the imaging apparatus per se is compatible with the DICOM standards, the software interface 530 and the analog control module 540 can be dispensed with.

The X-ray detector 440 is not limited to use with an X-ray imaging apparatus for medical purposes but also can be utilized as it is with an X-ray imaging apparatus for industrial use intended for non-destructive inspection or the like, and X-ray detectors intended for such use also belong to the Scope of Claims of the present invention.

Many widely different embodiments of the invention may be configured without departing from the spirit and the scope of the present invention. It should be understood that the present invention is not limited to the specific embodiments described in the specification, except as defined in the appended claims.

The invention claimed is:

1. An X-ray detector comprising:
an analog imaging apparatus configured to generate X-ray images; and
a digital detector unit configured to detect a two-dimensional intensity distribution of incident X-rays and generate detection signals, said digital detector unit comprising a processor embedded in said digital detector unit and an interface unit integrated with said processor, said interface unit coupled to said analog imaging apparatus, and conforming to open standards regarding images for medical use and communication, said interface unit configured to transmit the detection signals from said digital detector unit to said analog imaging apparatus, and said analog imaging apparatus generating the X-ray images from the detection signals.

2. The X-ray detector according to claim 1, wherein said interface unit comprises:
a first node on a detector unit side of said interface unit;
a second node on a detection signal utilizing device side of said interface unit; and
a network linking said first node and said second node.

3. The X-ray detector according to claim 2, wherein said network is an Ethernet network.

4. The X-ray detector according to claim 2, wherein said first node and said second node perform communication conforming to Transmission Control Protocol/Internet Protocol (TCP/IP).

5. The X-ray detector according to claim 3, wherein said first node and said second node perform communication conforming to Transmission Control Protocol/Internet Protocol (TCP/IP).

6. The X-ray detector according to claim 2, wherein said first node is integrated with said detector unit.

7. The X-ray detector according to claim 2, wherein:
said network is an Ethernet network; and
said first node is integrated with said detector unit.

8. The X-ray detector according to claim 2, wherein:
said first node and said second node perform communication conforming to Transmission Control Protocol/Internet Protocol (TCP/IP); and
said first node is integrated with said detector unit.

9. The X-ray detector according to claim 3, wherein:
said first node and said second node perform communication conforming to Transmission Control Protocol/Internet Protocol (TCP/IP); and
said first node is integrated with said detector unit.

10. The X-ray detector according to claim 1, wherein said open standards are Digital Imaging and Communications in Medicine (DICOM) standards.

11. The X-ray detector according to claim 2, wherein said open standards are Digital Imaging and Communications in Medicine (DICOM) standards.

12. The X-ray detector according to claim 10, wherein said network is an Ethernet network.

13. The X-ray detector according to claim 4, wherein said open standards are Digital Imaging and Communications in Medicine (DICOM) standards.

14. The X-ray detector according to claim 3, wherein:
said open standards are Digital Imaging and Communications in Medicine (DICOM) standards; and
said first node and said second node perform communication conforming to Transmission Control Protocol/Internet Protocol (TCP/IP).

15. The X-ray detector according to claim 6, wherein said open standards are Digital Imaging and Communications in Medicine (DICOM) standards.

16. The X-ray detector according to claim 2, wherein:
said open standards are Digital Imaging and Communications in Medicine (DICOM) standards;
said network is an Ethernet network; and
said first node is integrated with said detector unit.

17. A method for generating an image, said method comprising:
detecting a two-dimensional intensity distribution of incident X-rays with a digital detector unit;
generating a detection signal based on the two-dimensional intensity distribution of incident X-rays using a processor embedded in the digital detector unit;
transmitting the detection signal to an analog imaging device via an interface unit that conforms to open standards of communication, the interface unit integrated with the processor of the digital detector unit; and
generating an image with the analog imaging device using the detection signal.

18. A method according to claim 17, wherein said transmitting the detection signal via an interface unit comprises transmitting the detection signal from the interface unit via an Ethernet network to the analog image device.

19. A method according to claim 17, wherein said transmitting the detection signal via an interface unit comprises transmitting the detection signal to the analog imaging device via an interface unit that conforms to Digital Imaging and Communications in Medicine (DICOM) standards.

20. A method according to claim 17, wherein said transmitting the detection signal via an interface unit comprises transmitting the detection signal to the analog imaging device via an interface unit that conforms to Transmission Control Protocol/Internet Protocol (TCP/IP).

* * * * *